J. HRIBAR.
BRAKE MECHANISM.
APPLICATION FILED OCT. 28, 1914.

1,174,982.

Patented Mar. 14, 1916.

WITNESSES
Jas. K. McCathran
F. T. Chapman

J. Hribar, INVENTOR
BY
ATTORNEY

UNITED STATES PATENT OFFICE.

JOE HRIBAR, OF WAUKEGAN, ILLINOIS, ASSIGNOR OF ONE-HALF TO JACOB KUTCLER, OF NORTH CHICAGO, ILLINOIS.

BRAKE MECHANISM.

1,174,982.  Specification of Letters Patent.  Patented Mar. 14, 1916.

Application filed October 28, 1914. Serial No. 869,075.

*To all whom it may concern:*

Be it known that I, JOE HRIBAR, a subject of the Emperor of Austria-Hungary, residing at Waukegan, in the county of Lake and State of Illinois, have invented a new and useful Brake Mechanism, of which the following is a specification.

This invention has reference to brake mechanism, and its object is to provide means whereby a shaft may be free to turn in one direction and automatically lock against rotation in the other direction, or may be free to turn in either direction and automatically lock in the opposite direction, or may be released from restraint so as to turn freely in either direction.

The invention is applicable to many uses where an automatic but readily released stop against reverse movements is desired.

The invention comprises a bearing or structure into or through which an operating shaft extends and which shaft is arranged in the path of movement of a ball constantly urged toward the shaft by spring pressure, so that the shaft will freely turn in one direction but will be at once locked against reverse rotation. In conjunction with the ball there is provided a pin movable against the ball to compress the spring and hold the ball away from the shaft so that so long as the pin pressure is maintained the shaft is free to rotate in either direction, but on the release of the pin pressure the ball is at once moved into engagement with the shaft to resist any reverse rotation thereof. By providing ball stop members on opposite sides of the shaft with corresponding operating pins for the balls the shaft may be freely rotated in either direction if such be desirable, and its rotation in either direction may be arrested at will, or the shaft may be locked from rotation in either direction, the locking means acting simultaneously on both sides of the shaft if such be desirable, whereby the shaft is locked both ways against rotation, but may be released at will for rotation in either direction.

The invention will be best understood from a consideration of the following detailed description taken in connection with the accompanying drawings forming a part of this specification, with the further understanding that while the drawings show a practical form of the invention the latter is not confined to any strict conformity with the showing of the drawings, but may be changed and modified so long as such changes and modifications mark no material departure from the salient features of the invention.

Figure 1:
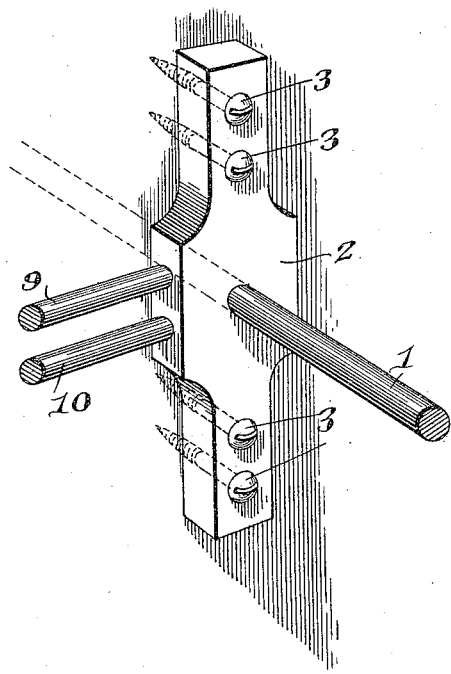
Figure 2:
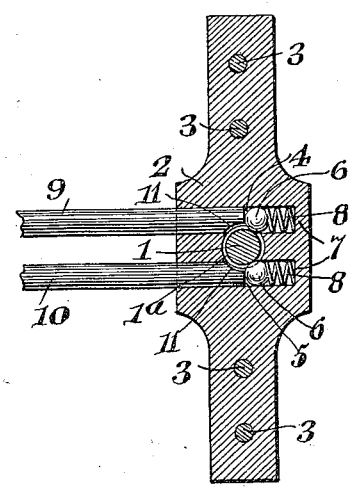
Figure 3:
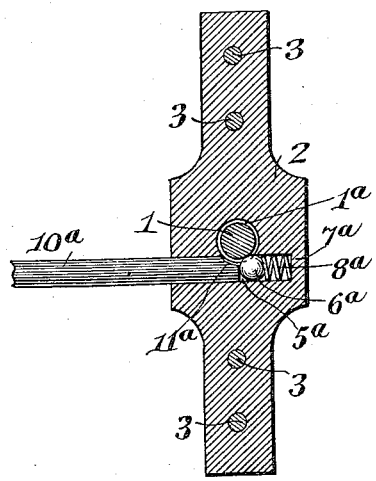

In the drawings:—Figure 1 is a perspective view of a device embodying the present invention. Fig. 2 is a longitudinal section in the plane of the releasing pin. Fig. 3 is a view similar to Fig. 2, but showing a structure wherein only one stop or clutch member and one releasing pin is employed.

Referring to the drawings there is shown a shaft 1 which may be taken as either a drive or a driven shaft, the rotative movements of which it is desirable to control. This shaft enters or extends through a block 2 which in Fig. 1 is indicated as applied to a suitable surface by screws 3 holding the block in fixed position, but it will be understood that this is not necessarily the only arrangement which may be employed for the block 2 may be otherwise mounted, so that either the shaft or the block becomes the rotatable member and the other the fixed member or both may rotate, the principal features of the invention remaining the same in either instance. Extending into the block for an appropriate distance on opposite sides of the shaft 1 in the showing of Figs. 1 and 2 are passages 4, 5, respectively, so arranged that one side of each passage is tangential to a circle of slightly less diameter than that of a circumferential groove 1ª in the shaft 1. Mounted in each passage 4 and 5 is a ball 6 which may snugly yet freely fit the passage and is confined in the passage between the shaft 1 and the closed end of the passage indicated at 7. The confinement of the ball is due to the presence of the shaft 1 which encroaches slightly into the respective passages 4 and 5. The ball 6 of each passage is held normally in contact with a shaft by a spring 8 lodged between the ball and closed end 7 of the passage, but because of the encroachments of the shaft 1 upon the respective passages 4 and 5 the ball cannot escape therefrom, though urged by the spring 8. With such an arrangement the two balls 6 constitute an effective lock against any rotative movement whatever of the shaft 1, for if the attempt be made to rotate the shaft in either direction the respective spring 8 urges the corresponding ball 6 against the shaft in a manner to cause the ball to wedge between the shaft and the opposite side of the respective passage 4 or 5, as the case may be, and this wedging action is sufficient to effectively hold the shaft against rotation under any force short of one destructive of the parts.

Each passage 4 and 5 is entered by a respective pin 9, 10 and the inner end of each pin is beveled or cut away as shown at 11, so that it may engage the ball 4 or 5 without engagement with the shaft 1. When sufficient force is applied to one of the pins, say, the pin 9, to overcome the resistance of the respective spring 8, the ball 6 in the passage 4 is moved away from the shaft 1 and held in such position by the pin 9. Under these circumstances the shaft 1 may be freely rotated in a counterclockwise direction as viewed in Fig. 2, since the ball 6 in the passage 5 then offers no resistance at all to the rotation of the shaft 1. If, now, the pin 10 be moved into the passage 5 so as to engage the corresponding ball 6 and compress the spring 8 until the ball is out of contact with the shaft 1, the latter may be rotated in the opposite direction, or in fact in either direction without any interference whatever by the balls 6. If the pin 9 be withdrawn sufficiently to allow the ball 6 controlled thereby to engage the shaft 1 counterclockwise rotation of the shaft 1 is entirely stopped, although the shaft may be freely rotated in a clockwise direction. If instead of withdrawing the pin 9 the pin 10 be withdrawn, then clockwise rotation of the shaft is prevented, but counterclockwise rotation thereof may be effected.

If the stopping of the rotation of the shaft in both directions is not demanded and it is only desirable to stop its rotation in one direction, then the structure of Fig. 3 may be employed. In this case a single passage 5$^a$ intersects the passage provided for the shaft 1 and this passage contains a ball 6$^a$ urged by a spring 8$^a$ lodged at one end against the closed end 7$^a$ of the passage, while the pin 10$^a$ having a beveled end 11$^a$ is introduced into the passage 5$^a$ to control the ball 6$^a$ therein. In the structure of Fig. 3 the shaft 1 is always free to rotate in a counterclockwise direction as viewed in said figure, and is automatically locked against clockwise rotation in the absence of the pin 10$^a$. If, however, it be desired to release the shaft 1 to rotation in either direction in the structure of Fig. 3, the pin 10$^a$ is moved into the passage 5$^a$ until it engages the ball 6$^a$ and compresses the spring 8$^a$ sufficiently to move the ball 6$^a$ out of operative relation to the shaft 1.

The device of the present invention is susceptible of use wherever it is desirable to produce either one way rotation of the shaft without reverse rotation or reverse rotation at and for predetermined periods, the rotation of the shaft in either direction to be arrested at definite times with the possibility of the shaft rotating freely in either direction when desired. The pins 9 and 10 or the pin 10$^a$ are operable automatically or otherwise. The shaft 1 is also locked against longitudinal movement by the engagement of the ball or balls in the groove 1$^a$ so that the shaft is retained in the block 2 or the latter is retained on the shaft without the need of collars or other like holding devices.

What is claimed is:—

1. In a brake mechanism, the combination with a shaft, of a block having a passage in which the shaft fits for rotation, and another passage intersecting the first-named passage to one side of the longitudinal center line of the latter with the shaft encroaching on the second-named passage, a ball lodged in the second-named passage and provided with yieldable means urging the ball into engagement with the shaft, and a pin movable axially lengthwise of the second passage and having the end entering said second passage adapted to engage the ball without engaging the shaft, whereby the ball may be moved out of engaging relation to the shaft and there held.

2. In a brake mechanism, the combination with a shaft, of a block provided with a passage in which the shaft fits for rotation, and other passages in transverse relation to the first-named passage and located on opposite sides of the shaft passages in position to be encroached upon by the shaft, a ball lodged in each passage, a spring in each passage in position to move the respective ball into engagement with the shaft, and pins, one for each passage, movable into engagement with the ball in the passage in opposition to the spring and shaped to engage the ball and move it away from the shaft without engaging the shaft.

3. A brake mechanism comprising a block having a passage adapted to receive a shaft and another passage in transverse relation to the first-named passage and encroached upon by said second-named passage, the latter having one end closed and the other end open, and a ball and spring lodged in the second-named passage with the spring located between the ball and the closed end of the passage, and means for moving the ball against the action of the spring, comprising a pin adapted to enter the second-named passage through the open end thereof and having the entering end beveled or cut away to engage and move the ball out of operative relation to the first-named passage without encroaching upon said first-named passage.

4. The combination with a shaft, of a block having a passage in which the shaft is fitted for rotation, transverse passages on opposite sides of the first-named passage and encroached upon thereby, each of said second-named passages having one end closed and the other end open, a ball and spring in each passage with the spring lodged between the ball and the closed end of the passage, and a ball operating pin for each of the second-named passages, said pin being movable into the passage through the open end thereof and having the entering end beveled or cut away to engage the ball and move it away from the shaft without engaging the shaft.

5. In a brake mechanism, the combination with a shaft, of a block having a passage therein for receiving the shaft and another passage extending transversely of the first-named passage and encroached upon by the shaft when located in the first-named passage, said second-named passage having one end closed and the other end freely open, a ball lodged in the second-named passage and a spring lodged between the ball and the closed end of the second-named passage, the ball and spring being retained in the passage by the encroaching portion of the shaft and said ball being yieldable in a direction away from the shaft on the application of a suitable force to the ball to permit the shaft to rotate freely in either direction.

6. In a brake mechanism, the combination with a shaft provided with a circumferential groove, of a block having a passage in which the shaft fits for rotation, and another passage in transverse relation to the first-named passage at one side thereof with the shaft where grooved encroaching on the second-named passage, a ball lodged in the second-named passage to engage the shaft where provided with the groove, and a spring urging the ball into engagement with the shaft, said second-named passage being adapted to receive on the side of the shaft remote from the ball means for moving the ball against the action of the spring.

7. A brake mechanism comprising a shaft having a circumferential groove, a block having a passage adapted to receive the shaft, and other passages on opposite sides of the first-named passage and encroached by the grooved portion of the shaft, a ball lodged in each of the second-named passages in position to engage the shaft in the grooved portion thereof, a spring urging each ball toward the shaft, and means in each passage for engaging and moving the ball therein against the action of the spring to relieve the shaft from the action of the ball.

In testimony, that I claim the foregoing as my own, I have hereto affixed my signature in the presence of two witnesses.

JOE HRIBAR.

Witnesses:
MARTIN C. DECKER,
ETHEL M. GARTLEY.

Copies of this patent may be obtained for five cents each, by addressing the "Commissioner of Patents, Washington, D. C."